US011716779B2

(12) United States Patent
Khlass et al.

(10) Patent No.: US 11,716,779 B2
(45) Date of Patent: Aug. 1, 2023

(54) USER EQUIPMENT CONTEXT RELOCATION AT RADIO ACCESS NETWORK NOTIFICATION AREA EDGE

(71) Applicant: Nokia Technologies Oy, Espoo (FI)

(72) Inventors: Ahlem Khlass, Paris (FR); Daniela Laselva, Klarup (DK); Subramanya Chandrashekar, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 3 days.

(21) Appl. No.: 17/412,122

(22) Filed: Aug. 25, 2021

(65) Prior Publication Data
US 2022/0070958 A1 Mar. 3, 2022

(30) Foreign Application Priority Data

Aug. 26, 2020 (IN) .............. 202041036784

(51) Int. Cl.
*H04W 76/19* (2018.01)
*H04W 8/18* (2009.01)
*H04W 8/02* (2009.01)
*H04W 76/27* (2018.01)

(52) U.S. Cl.
CPC .............. *H04W 76/19* (2018.02); *H04W 8/02* (2013.01); *H04W 8/18* (2013.01); *H04W 76/27* (2018.02)

(58) Field of Classification Search
CPC ........... H04W 8/02; H04W 8/14; H04W 8/18; H04W 76/19; H04W 76/20; H04W 76/27; H04W 76/30
See application file for complete search history.

(56) References Cited

U.S. PATENT DOCUMENTS

| 10,880,948 B2 * | 12/2020 | Centonza | H04W 64/00 |
| 2009/0160711 A1 * | 6/2009 | Mehta | G01S 19/48 342/450 |
| 2011/0093584 A1 * | 4/2011 | Qiu | H04L 61/4511 709/224 |
| 2011/0176437 A1 * | 7/2011 | Sekiguchi | H04L 43/026 370/252 |
| 2013/0022010 A1 * | 1/2013 | Qianxi | H04L 5/0033 370/329 |
| 2014/0230044 A1 * | 8/2014 | Liu | H04L 41/28 726/15 |
| 2017/0181070 A1 * | 6/2017 | Gupta | H04W 48/18 |
| 2019/0104455 A1 * | 4/2019 | Park | H04W 76/20 |
| 2020/0267632 A1 * | 8/2020 | Lindheimer | H04W 48/16 |
| 2020/0314700 A1 * | 10/2020 | Da Silva | H04W 36/0011 |
| 2021/0022200 A1 * | 1/2021 | Mildh | H04W 76/38 |
| 2021/0051472 A1 * | 2/2021 | Shih | H04W 12/04 |
| 2021/0092793 A1 * | 3/2021 | Centonza | H04W 76/27 |
| 2021/0211994 A1 * | 7/2021 | Shih | H04W 76/27 |

(Continued)

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

(Continued)

*Primary Examiner* — Jean A Gelin
(74) *Attorney, Agent, or Firm* — Harrington & Smith

(57) ABSTRACT

Systems, methods, apparatuses, and computer program products for user equipment context relocation at radio access network notification area edge are provided.

20 Claims, 15 Drawing Sheets

(56) References Cited

U.S. PATENT DOCUMENTS

| | | | |
|---|---|---|---|
| 2021/0212004 A1* | 7/2021 | Lu | H04W 56/0045 |
| 2021/0307107 A1* | 9/2021 | Wang | H04W 76/27 |
| 2021/0337623 A1* | 10/2021 | Tseng | H04W 68/02 |
| 2021/0400462 A1* | 12/2021 | Huang | H04W 8/005 |
| 2022/0030489 A1* | 1/2022 | Sharma | H04W 36/08 |
| 2022/0061121 A1* | 2/2022 | Han | H04W 76/27 |
| 2022/0078876 A1* | 3/2022 | Lindheimer | H04W 60/04 |
| 2022/0086732 A1* | 3/2022 | Chandrashekar | H04W 72/0426 |
| 2022/0104299 A1* | 3/2022 | Kim | H04W 76/27 |
| 2022/0110085 A1* | 4/2022 | Khoryaev | H04L 5/0051 |
| 2022/0151014 A1* | 5/2022 | Kedalagudde | H04W 76/19 |
| 2022/0248493 A1* | 8/2022 | Kim | H04W 36/0033 |
| 2022/0256641 A1* | 8/2022 | Kwon | H04W 76/27 |
| 2022/0287133 A1* | 9/2022 | Hsieh | H04W 76/19 |
| 2022/0385428 A1* | 12/2022 | Hao | H04W 24/08 |

OTHER PUBLICATIONS

"3rd Generation Partnership Project; Technical Specification Group Radio Access Network; NR; User Equipment (UE) procedures in Idle mode and RRC Inactive state (Release 16)", 3GPP TS 38.304, V16.0 0, Mar. 2020, pp. 1-38.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"Work Item on NR smalldata transmissions in Inactive state", 3GPP TSG RAN Meeting #86, RP-193252, Agenda: 9.1.2, ZTE Corporation, Dec. 9-12, 2019, 4 pages.

"3rd Generation Partnership Project; Technical Specification Group Radio Access Network; NG-RAN; Xn application protocol (XnAP) (Release 16)", 3GPP TS 38.423, V16.1.0, Mar. 2020, pp. 1-334.

"3rd Generation Partnership Project; Technical Specification Group Radio Access Network; Study on self evaluation towards IMT-2020 submission (Release 16)", 3GPP TR 37.910, V16.1.0, Sep. 2019, pp. 1-146.

"3rd Generation Partnership Project; Technical Specification Group Radio Access Network; NR; Study on User Equipment (UE) power saving in NR (Release 16)", 3GPP TR 38.840, V16.0.0, Jun. 2019, pp. 1-74.

Finland Application No. 20205216, "Efficient Transfer of Access Context for User Equipment Among Network Nodes", filed on Mar. 2, 2020, 49 pages.

* cited by examiner

```
SuspendConfig ::=                   SEQUENCE {
    fullI-RNTI                          I-RNTI-Value,
    shortI-RNTI                         ShortI-RNTI-Value,
    ran-PagingCycle                     PagingCycle,
    ran-NotificationAreaInfo            RAN-NotificationAreaInfo
OPTIONAL,   -- Need M
    t380                                PeriodicRNAU-TimerValue
OPTIONAL,   -- Need R
    nextHopChainingCount                NextHopChainingCount,
    ...
}

...
PeriodicRNAU-TimerValue ::=         ENUMERATED { min5, min10, min20, min30, min60, min120, min360, min720}
...

RAN-NotificationAreaInfo ::=        CHOICE {
    cellList                            PLMN-RAN-AreaCellList,
    ran-AreaConfigList                  PLMN-RAN-AreaConfigList,
    ...
}
```

| SuspendConfig field descriptions |
| --- |
| ran-NotificationAreaInfo |
| Network ensures that the UE in RRC_INACTIVE always has a valid *ran-NotificationAreaInfo*. |
| ran-PagingCycle |
| Refers to the UE specific cycle for RAN-initiated paging. Value *rf32* corresponds to 32 radio frames, value *rf64* corresponds to 64 radio frames and so on. |
| t380 |
| Refers to the timer that triggers the periodic RNAU procedure in UE. Value *min5* corresponds to 5 minutes, value *min10* corresponds to 10 minutes and so on. |

| RAN-NotificationAreaInfo field descriptions |
| --- |
| cellList |
| A list of cells configured as RAN area. |
| ran-AreaConfigList |
| A list of RAN area codes or RA code(s) as RAN area. |

Fig. 2

```
-- ASN1START
-- TAG-RRCRESUMEREQUEST-START

RRCResumeRequest ::=           SEQUENCE {
    rrcResumeRequest               RRCResumeRequest-IEs
}

RRCResumeRequest-IEs ::=       SEQUENCE {
    resumeIdentity                 ShortI-RNTI-Value,
    resumeMAC-I                    BIT STRING (SIZE (16)),
    resumeCause                    ResumeCause,
    spare                          BIT STRING (SIZE (1))
}

-- TAG-RRCRESUMEREQUEST-STOP
-- ASN1STOP
```

| RRCResumeRequest-IEs field descriptions |
|---|
| resumeCause |
| Provides the resume cause for the RRC connection resume request as provided by the upper layers or RRC. The network is not expected to reject an *RRCResumeRequest* due to unknown cause value being used by the UE. |
| resumeIdentity |
| UE identity to facilitate UE context retrieval at gNB. |
| resumeMAC-I |
| Authentication token to facilitate UE authentication at gNB. The 16 least significant bits of the MAC-I calculated using the AS security configuration as specified in 5.3.13.3. |

Fig. 3

```
-- ASN1START
-- TAG-RESUMECAUSE-START

ResumeCause ::=        ENUMERATED {emergency, highPriorityAccess, mt-Access, mo-Signalling,
                           mo-Data, mo-VoiceCall, mo-VideoCall, mo-SMS, rna-Update, mps-PriorityAccess,
                           mcs-PriorityAccess, spare1, spare2, spare3, spare4, spare5 }

-- TAG-RESUME-CAUSE-STOP
-- ASN1STOP
```

Fig. 4

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Global NG-RAN Node ID | M | | 9.2.2.3 | | YES | reject |
| TAI Support List | M | | 9.2.3.20 | List of supported TAs and associated characteristics. | YES | reject |
| AMF Region Information | M | | 9.2.3.83 | Contains a list of all the AMF Regions to which the NG-RAN node belongs. | YES | reject |
| List of Served Cells NR | | 0 .. <maxnoofCellsin NG-RAN node> | | Contains a list of cells served by the gNB. If a partial list of cells is signalled, it contains at least one cell per carrier configured at the gNB | YES | reject |
| >Served Cell Information NR | M | | 9.2.2.11 | | -- | |
| >Neighbour Information NR | O | | 9.2.2.13 | | -- | |
| ... | | | | | | |

| IE/Group Name | Presence | Range | IE type and reference | Semantics description | Criticality | Assigned Criticality |
|---|---|---|---|---|---|---|
| NR-PCI | M | | INTEGER (0..1007, ...) | NR Physical Cell ID | -- | |
| NR CGI | M | | 9.2.2.7 | | -- | |
| TAC | M | | 9.2.2.5 | Tracking Area Code | -- | |
| RANAC | O | | RAN Area Code 9.2.2.6 | | -- | |
| ... | | | | | | |

Fig. 10

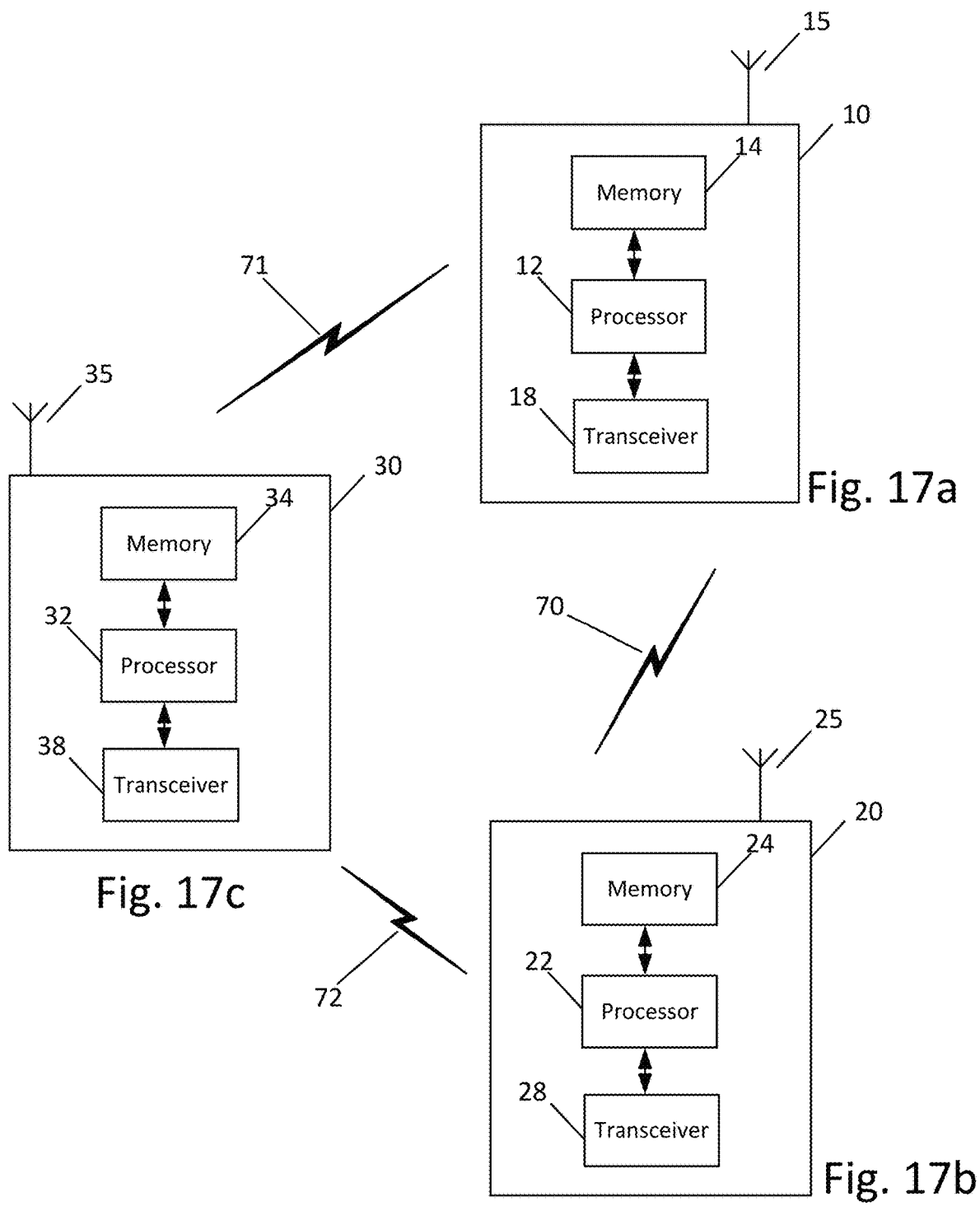

USER EQUIPMENT CONTEXT RELOCATION AT RADIO ACCESS NETWORK NOTIFICATION AREA EDGE

RELATED APPLICATIONS

The present application claims priority from Indian Provisional Patent Application No. 202041036784, filed on Aug. 26, 2020, which is hereby incorporated in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods of user equipment (UE) context relocation at radio access network (RAN) notification area (RNA) edge.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment is directed to a method, which may include acquiring, at a target network node, first assistance information related to relocation of a user equipment (UE) context of a user equipment (UE) in radio resource control (RRC) inactive state based at least on information related to a radio access network (RAN) notification area (RNA) of the user equipment (UE). The method may also include providing second assistance information related to the relocation of the user equipment (UE) context to an anchor network node.

Another embodiment is directed to an apparatus including at least one processor and at least one memory comprising computer program code. The at least one memory and computer program code may be configured, with the at least one processor, to cause the apparatus at least to include acquire first assistance information related to relocation of a user equipment (UE) context of a user equipment (UE) in radio resource control (RRC) inactive state based at least on information related to a radio access network (RAN) notification area (RNA) of the user equipment (UE). The at least one memory and computer program code may also be configured, with the at least one processor, to cause the apparatus at least to provide second assistance information related to the relocation of the user equipment (UE) context to an anchor network node.

Another embodiment is directed to an apparatus that may include means for acquiring, at a target network node, first assistance information related to relocation of a user equipment (UE) context of a user equipment (UE) in radio resource control (RRC) inactive state based at least on information related to a radio access network (RAN) notification area (RNA) of the user equipment (UE). The apparatus may also include means for providing second assistance information related to the relocation of the user equipment (UE) context to an anchor network node.

In a variant, the acquiring of the first assistance information may include receiving an indication from the user equipment (UE). According to some variants, at least one of the acquiring of the first assistance information or the providing of the second assistance information may be performed upon receiving the indication from the user equipment (UE). In a variant, the receiving of the indication may include receiving a resume request message from the user equipment.

According to certain variants, the method may include, or the apparatus may be controlled, to determine, based on the first assistance information related to the relocation of the user equipment (UE) context, whether the target network node (or apparatus) is located at an edge of radio access network (RAN) notification area (RNA) configured for the user equipment.

In a variant, the providing of the second assistance information may include providing assistance information related to the RNA edge node determination to the anchor network node, when it is determined that the target network node (or apparatus) is located at the edge of RNA configured for the user equipment (UE).

According to a variant, the second assistance information may include a request for context relocation or a preference for context relocation.

In some variants, the providing of the second assistance information may include sending the second assistance information to the anchor network node as part of a context retrieve procedure.

According to a variant, when it is determined that there is no need for the relocation of the user equipment (UE) context, omitting the providing of the second assistance information to the anchor network node.

In a variant, it may be determined that there is no need for the relocation of the user equipment (UE) context if the target network node (or apparatus) is not located at RNA edge of the user equipment's (UE's) RNA.

According to some variants, the providing of the assistance information comprises indicating, to the anchor network node, that the target network node (or apparatus) is an RNA edge node.

In a variant, the method may include, or the apparatus controlled, to determine whether the target network node (or apparatus) is located at the edge of radio access network (RAN) notification area (RNA) configured for the user equipment based on radio access network area code (RANAC) assignment of network nodes neighboring the target network node (or apparatus).

According to some variants, the indication or the resume request message comprises the first assistance information from the user equipment (UE) related to relocation of the user equipment (UE) context. In a variant, the first assistance information, from the user equipment, may include an indication that the target network node (or apparatus) is at the edge of the user equipment's configured RNA.

In a variant, the providing of the second assistance information may include sending a list of radio access network area code (RANAC) assignments of neighboring network nodes of the target network node (or apparatus) to the anchor network node.

According to a variant, the first assistance information from the user equipment (UE) may include an actual RNA configuration of the user equipment (UE). In a variant, the actual RNA configuration comprises full or part of the RNA information stored at the user equipment.

In some variants, when the target network node has Xn connectivity with at least one other network node associated with a radio access network area code (RANAC) that is not part of the actual RNA configuration of the user equipment, the target network node (or apparatus) is considered to be located at RNA edge of the user equipment.

According to a variant, the providing of the second assistance information may include sending the second assistance information to the anchor network node at one or more periodic radio access network notification area updates (RNAUs).

In a variant, an absence of an indication from the user equipment for RNA-crossing based RNAUs indicates periodic RNAU. According to a variant, the receiving of the user equipment assistance information related to RNA edge node condition indicates periodic RNAU.

Another embodiment is directed to a method, which may include receiving, at an anchor network node from a target network node, a context retrieval request comprising assistance information related to relocation of a user equipment (UE) context of a user equipment (UE) in radio resource control (RRC) inactive state. The method may include, based on the assistance information, determining whether to relocate the user equipment (UE) context.

Another embodiment is directed to an apparatus including at least one processor and at least one memory comprising computer program code. The at least one memory and computer program code may be configured, with the at least one processor, to cause the apparatus at least to receive, from a target network node, a context retrieval request comprising assistance information related to relocation of a user equipment (UE) context of a user equipment (UE) in radio resource control (RRC) inactive state. The at least one memory and computer program code may be configured, with the at least one processor, to cause the apparatus at least to, based on the assistance information, determine whether to relocate the user equipment (UE) context.

Another embodiment is directed to an apparatus that may include means for receiving, from a target network node, a context retrieval request comprising assistance information related to relocation of a user equipment (UE) context of a user equipment (UE) in radio resource control (RRC) inactive state. The apparatus may include, based on the assistance information, means for determining whether to relocate the user equipment (UE) context.

According to a variant, the determining of whether to relocate the user equipment context comprises determining, using the assistance information, whether the target network node is at a RNA edge of the user equipment's RNA. In a variant, when the target network node is at the RNA edge of the user equipment, the method may include, or the apparatus may be controlled, to relocate the user equipment context. According to a variant, when the target network node is not at the RNA edge of the user equipment, then the user equipment context is not relocated.

In some variants, the assistance information may include an indication that the target network node is an RNA edge node. According to a variant, the assistance information may include a list of radio access network area code (RANAC) assignments of neighbor network nodes of the target network node. In certain variants, the assistance information may include information related to the RNA edge node determination to the anchor network node (or apparatus), when it is determined that the target network node is located at the edge of RNA configured for the user equipment (UE).

According to a variant, the receiving comprises receiving the assistance information at one or more periodic radio access network notification area updates (RNAUs).

Another embodiment is directed to a method that may include providing, by a user equipment to a target network node, at least one of: partial or full radio access network (RAN) notification area (RNA) configuration of the user equipment and/or assistance information relating to whether the target node is an edge node for the RNA.

Another embodiment is directed to an apparatus including at least one processor and at least one memory comprising computer program code. The at least one memory and computer program code may be configured, with the at least one processor, to cause the apparatus at least to provide, to a target network node, at least one of: partial or full radio access network (RAN) notification area (RNA) configuration of the user equipment and/or assistance information relating to whether the target node is an edge node for the RNA.

Another embodiment is directed to an apparatus that may include means for providing, to a target network node, at least one of: partial or full radio access network (RAN) notification area (RNA) configuration of the user equipment and/or assistance information relating to whether the target node is an edge node for the RNA.

In a variant, the method may also include, or the apparatus controlled, to determine whether the target network node is an edge node for the RNA. According to some variants, the determining may include monitoring whether the target network node is at the edge of the RNA configured for the user equipment (or apparatus) based on a history and/or local learning at the user equipment (or apparatus).

In a variant, when it is determined that the target network node is at the edge of the RNA of the user equipment (or apparatus), the assistance information may include indicating or flagging to the target network node that it is at the edge of the RNA of the user equipment (or apparatus). According to a variant, the indicating or flagging may include indicating or flagging to the target network node that it is at the edge of the RNA of the user equipment (or apparatus) in a RRC resume request message.

In some variants, the method may also include, or the apparatus controlled, to assist the target network node to distinguish between periodic radio access network notification area updates (RNAUs) and RNA-crossing based RNAU. According to a variant, the assisting may include reporting an indication for RNA-crossing based RNAUs. In a variant, the indication may be included in a RRC resume request message.

According to certain variants, the resume request message may indicate whether the RNA update is due to the expiry of a periodic timer or an RNA crossing event. In a variant, the presence of the assistance information provided to the target cell indicates periodic RNAU.

BRIEF DESCRIPTION OF THE DRAWINGS

For proper understanding of example embodiments, reference should be made to the accompanying drawings, wherein:

FIG. 2 illustrates a Suspend Configuration information element (IE), according to an example;

FIG. 3 illustrates an example of an RRC resume request message IE;

FIG. 4 illustrates an example of a resume cause IE indicating reason for an RRC connection resumption;

FIG. 10 illustrates an example of some of the information contained in the Xn setup request or response messages, according to one example;

FIG. 17a illustrates an example block diagram of an apparatus, according to an embodiment;

FIG. 17b illustrates an example block diagram of an apparatus, according to an embodiment; and FIG. 17c illustrates an example block diagram of an apparatus, according to an embodiment.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products of user equipment (UE) context relocation at radio access network (RAN) notification area (RNA) edge, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Some example embodiments may relate to the radio resource control (RRC) inactive state (RRC_INACTIVE) and, for example, may be directed, in part, to reducing the latency and UE power consumption from the UE access stratum (AS) context retrieval.

$3^{rd}$ generation partnership project (3GPP) introduced the RRC_INACTIVE, in addition to existing RRC_CONNECTED and RRC_IDLE states, with a goal to reduce UE power consumption by alleviating the control plane (CP) procedures required at the RRC state change and associated latency.

Figure 1:
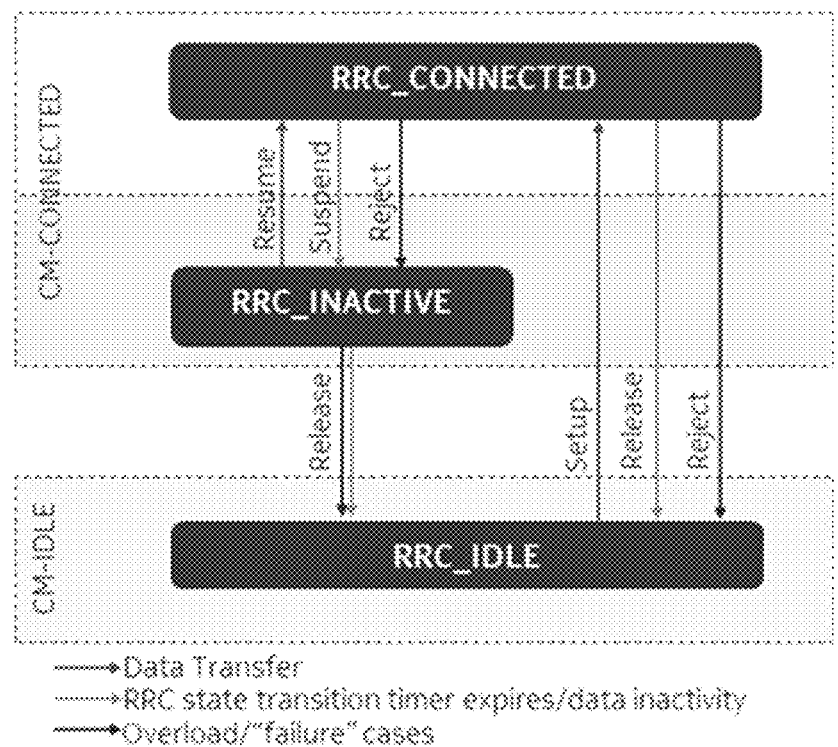
FIG. 1 illustrates a diagram depicting RRC states and their transitions in 5G NR, according to one example.

FIG. 1 illustrates an example diagram of RRC states and their transitions in 5G NR. As illustrated in FIG. 1, a UE is in RRC_CONNECTED state when both the radio and core network connections are established. If this is not the case, i.e., no connection established, then the UE is in RRC_IDLE state. When a UE is in RRC_INACTIVE state after a certain data inactivity period (e.g., based on a timer), the radio connection is suspended while the core network connectivity is maintained active (i.e., the UE is kept in Connection Management (CM)-CONNECTED state).

A UE Access Stratum (AS) context (referred to as UE inactive AS context) is stored at both UE and RAN sides and includes the latest radio bearer configuration used for the data/signalling transmission, security keys and algorithms for integrity protection and ciphering in the radio interface. Based on the retained information, the UE can resume the radio connection and restore the security context with a much lower delay and associated signalling overhead as compared to a UE in RRC_IDLE state that needs to establish a new connection to both the radio and core network.

In response to a RRC resume request, the network may resume a suspended RRC connection and transition the UE to RRC_CONNECTED, or reject the request to resume and transition the UE to RRC_INACTIVE (with a wait timer), or directly re-suspend the RRC connection and transition the UE to RRC_INACTIVE, or directly release the RRC connection and transition the UE to RRC_IDLE, or instruct the UE to initiate non-AS (NAS) level recovery (in this case the network sends an RRC setup message).

UEs in RRC_INACTIVE state are configured with a RAN Notification Area (RNA) which can cover a single or multiple cell(s). Inside their RNA, UEs can move without any notification to the network about their location (i.e., cell (re)-selections within the RNA are transparent to the network) and can resume their RRC connection in any cell using a unique identifier, e.g., inactive-radio network temporary identifier (I-RNTI); it identifies both the last serving gNB node, also referred to as the anchor gNB, and the UE itself. This anchor gNB may also keep the UE-associated connection with the serving Access and Mobility Management Function (AMF) and User Plane Function (UPF).

A UE in RRC_INACTIVE state can request to resume its suspended RRC connection prior to uplink (UL) data transmission, in response to a paging message for downlink (DL) data reception, and for RAN-based Notification Area Update (RNAU) procedure which may be triggered periodically by the UE and when it re-selects a cell outside the configured RNA.

If the UE attempts to access a gNB other than the anchor gNB, an XnAP retrieve UE context procedure may be initiated at the receiving gNB to get the UE AS context from the anchor gNB, identified through the I-RNTI. This may also trigger an Xn-UP address indication procedure including tunnel information for potential recovery of data from the anchor gNB. Upon successful UE context retrieval, the receiving gNB becomes the serving gNB and the UE is moved then to RRC_CONNECTED state. A NG application protocol (NGAP) path switch procedure is further initiated to update the user plane (UP) connection to the 5G core network from the anchor gNB to the new serving gNB. Once completed, the serving gNB releases the UE context at the anchor gNB by means of a XnAP UE context release procedure.

According to certain 3GPP releases, a UE in RRC_INACTIVE state has to resume the connection (i.e., move to RRC_CONNECTED state) to perform any downlink (DL) and Uplink (UL) data transmission. However, with small and infrequent data packets, the connection resume and subsequently suspend to RRC_INACTIVE state that may happen for each transmission will result in unnecessary power consumption, signalling overhead and latency.

To support small data transmission (SDT) in RRC_INACTIVE, three potential SDT solutions have been proposed. These solutions include: (1) 4-step random access channel (RACH) based SDT, (2) 2-step RACH based SDT, or (3) configured grant based SDT. According to the 4-step RACH based SDT, user data is transmitted in Msg3 (i.e., small payload multiplexed with an RRC Resume Request). According to 2-step RACH based SDT, the UP-data transmission happens with MsgA of a 2 RACH procedure and specifically on the PUSCH resources that are pre-configured by the gNB and broadcast in System Information with associated physical transmission parameters. According to the configured grant based SDT, a UE in RRC_INACTIVE state can receive a configuration grant (CG) type 1 configuration that indicates the specific pre-configured physical uplink shared channel (PUSCH) resources to be used for transmitting the adequate amount of data when having a valid time alignment.

Since small user-plane data may be sent using the security keys that are in the stored UE AS context or that can be derived based on information stored in the UE AS context, the UE context retrieval may be necessary if the UE accesses a cell that does not belong to the node storing the UE AS context (i.e., the anchor node) if the small data is not forwarding to the anchor node. Similarly, whether context relocation in the target gNB is needed in the context of SDT operations may depend on whether small data is not forwarded from the target to the anchor node. For instance, context retrieval and/or relocation would be required when the UE accesses to a cell for SDT operations that is outside the configured RNA. Thus, certain example embodiments of the present disclosure may also be applicable to SDT.

The 5G radio network can instruct a UE to move from RRC_CONNECTED to RRC_INACTIVE state with an RRC release message that contains a 'SuspendConfig' information element (IE). FIG. 2 illustrates an example of a SuspendConfig IE, along with the SuspendConfig field descriptions and RAN-NotificationAreaInfo field descriptions.

The resumption of a suspended RRC connection may be performed using a RRC resume procedure. FIG. 3 illustrates an example of an RRC resume request message IE, and FIG. 4 illustrates an example of a ResumeCause IE indicating the reason for the RRC connection resumption.

Figure 5:
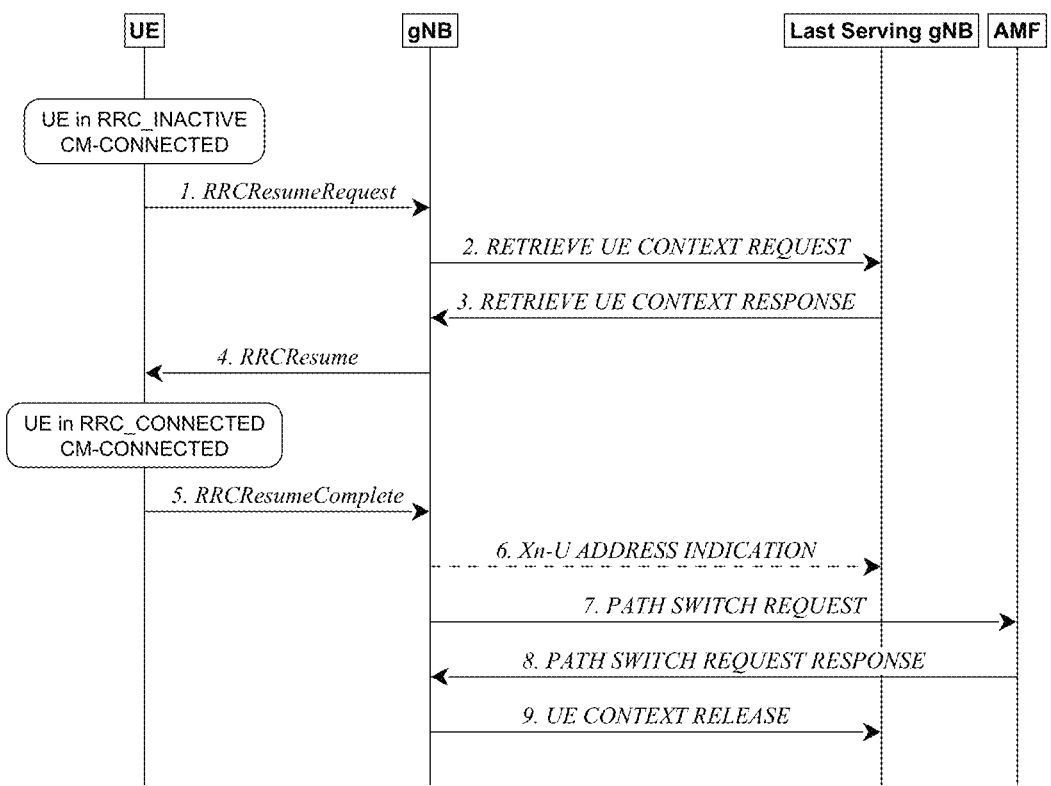
FIG. 5 illustrates an example signaling diagram of a RRC resume procedure with successful UE context retrieval, according to an example.

FIG. 5 illustrates an example signaling diagram of a RRC resume procedure with successful UE context retrieval. As illustrated in the example of FIG. 5, a UE is moved from RRC_INACTIVE to RRC_CONNECTED state. In particular, in this example, the UE begins in RRC_INACTIVE CM-CONNECTED state and, at 1, transmits a RRC resume request message to the gNB. The gNB may send, at 2, a retrieve UE context request to the last serving gNB and receive, at 3, a retrieve UE context response from the previous serving gNB. At 4, the gNB may provide a RRC resume message to the UE, which then moves to RRC_CONNECTED CM-CONNECTED state. The UE may then transmit, at 5, a RRC resume complete message to the gNB. After receiving the RRC resume complete message, the gNB may provide, at 6, a Xn-U address indication to the previous serving gNB and, at 7, transmit a path switch request to the AMF. The gNB may receive, at 8, a path switch request response from the AMF and, at 9, transmit a UE context release message to the last serving gNB.

A UE in the RRC_INACTIVE state can be configured by the last serving NG-RAN node with an RNA. The RNA can cover a single or multiple cells, and may be contained within the core network (CN) registration area. Additionally, Xn connectivity may be available within the RNA. A RAN-based notification area update (RNAU) may be periodically sent by the UE and may also be sent when the cell reselection procedure of the UE selects a cell that does not belong to the configured RNA.

Some alternatives on how the RNA can be configured include a list of cells, list of RAN areas, and/or a cell broadcasting one or more RAN area IDs in the system information. When the RNA is configured using a list of cells, a UE is provided an explicit list of cells (one or more) that constitute the RNA. When the RNA is configured using a list of RAN areas, a UE is provided (at least one) RAN area ID, where a RAN area is a subset of a CN tracking area or equal to a CN tracking area. A RAN area is specified by one RAN area ID, which is made up of a TAC and optionally a RAN area Code. Furthermore, a cell may broadcast one or more RAN area IDs in the system information.

Figure 6:
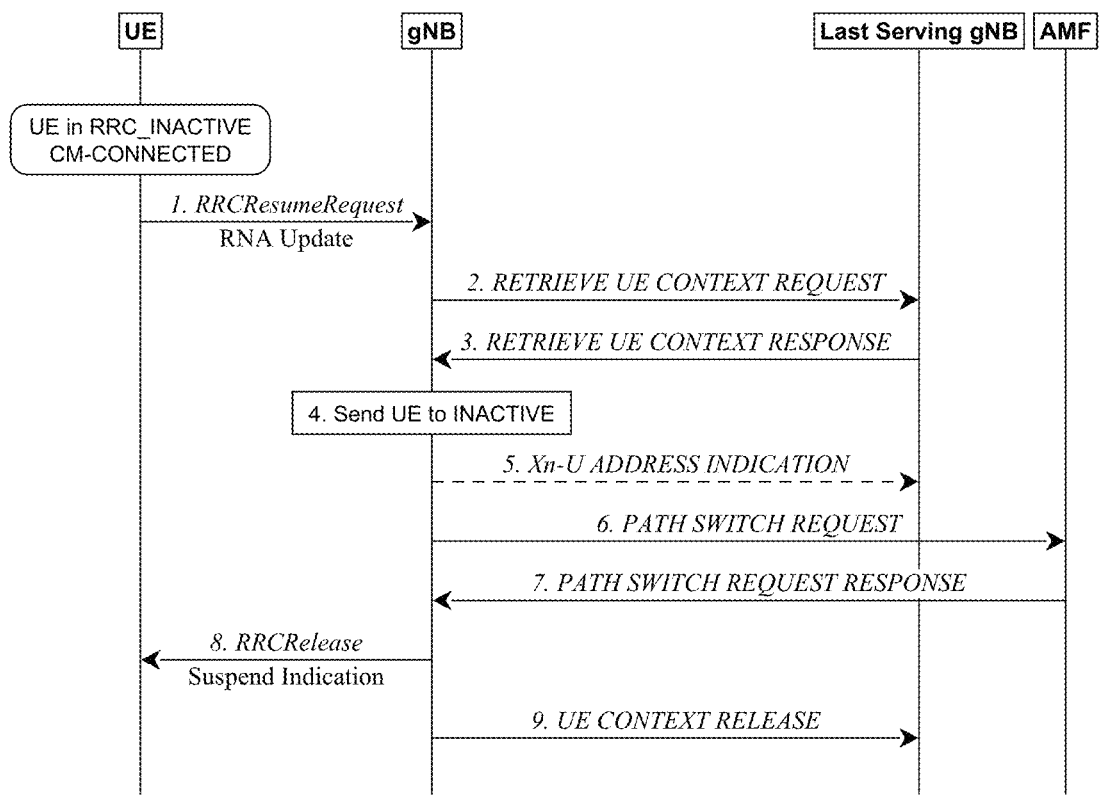
FIG. 6 illustrates an example signaling diagram of an RNA update procedure, according to an example.

When receiving RNA update request from the UE, the receiving gNB may decide to send the UE back to RRC_INACTIVE state, or send the UE to RRC_IDLE. FIG. 6 illustrates an example signaling diagram of an RNA update procedure involving context retrieval over Xn when the UE moves out of the configured RNA. As illustrated in the example of FIG. 6, the UE begins in RRC_INACTIVE CM-CONNECTED state and, at 1, transmits a RRC resume request message to the gNB with "RNA update" as a resumeCause. At 2, the gNB may provide a retrieve UE context request message to the previous serving gNB and, at 3, receive a retrieve UE context response message from the last serving gNB. At 4, the gNB may decide to send the UE to RRC_INACTIVE and, at 5, may provide a Xn-U address indication to the previous serving gNB. At 6, the gNB may transmit a path switch request to the AMF and, at 7, may receive a path switch request response from the AMF. The gNB may transmit, at 8, a RRC release suspend indication to the UE and, at 9, may transmit a UE context release message to the last serving gNB.

Figure 7:
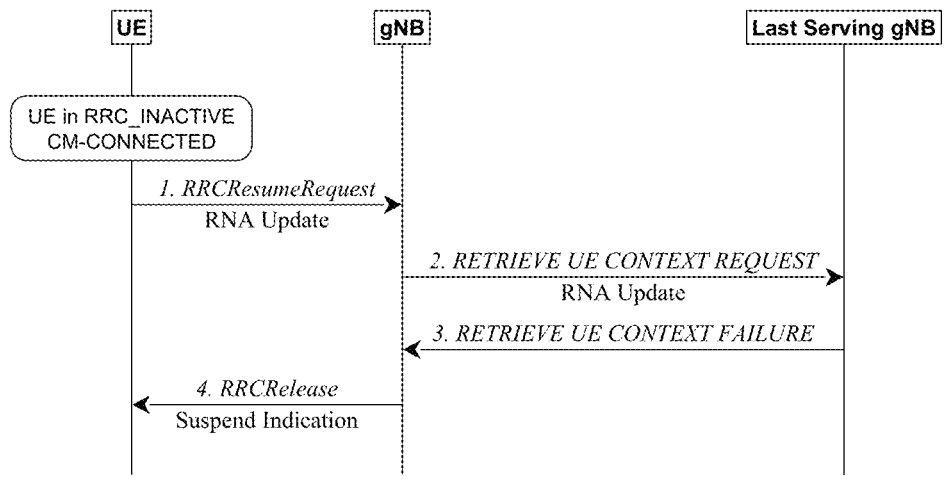
FIG. 7 illustrates an example signaling diagram of periodic RNA update procedure without context retrieval, according to an example.

FIG. 7 illustrates an example signaling diagram of periodic RNA update procedure without context retrieval where the UE is still within the configured RNA and the last serving gNB decides not to relocate the UE context and to keep the UE in RRC_INACTIVE state. As illustrated in the example of FIG. 7, the UE begins in RRC_INACTIVE CM-CONNECTED state and, at 1, transmits a RRC resume request message with "RNA update" as a resumeCause to the gNB. At 2, the gNB transmits a retrieve UE context request RNA update message to the previous serving gNB and, at 3, receives a retrieve UE context failure message from the previous serving gNB. The gNB may then transmit, at 4, a RRC release suspend indication message to the UE.

Figure 8:
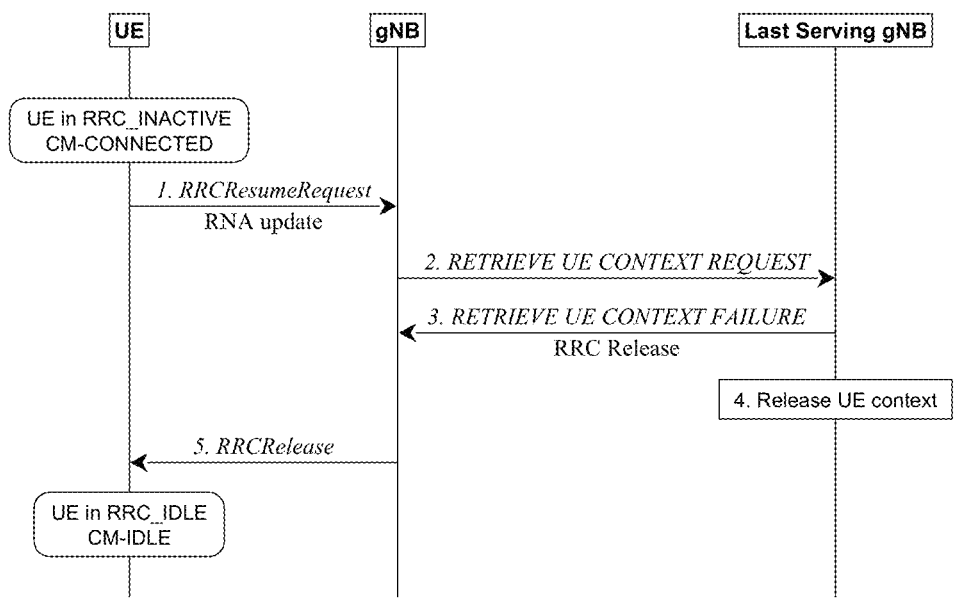
FIG. 8 illustrates an example signaling diagram of an RNA update procedure, according to an example.

FIG. 8 illustrates an example signaling diagram of an RNA update procedure for the case when the last serving gNB decides to move the UE to RRC_IDLE. As illustrated in the example of FIG. 8, the UE begins in RRC_INACTIVE CM-CONNECTED state and, at 1, transmits a RRC resume request message with "RNA update" as a resumeCause to the gNB. At 2, the gNB transmits a retrieve UE context request message to the last serving gNB and, at 3, receives a retrieve UE context failure message from the last serving gNB. At 4, the last serving gNB may release the UE context. The gNB may transmit, at 5, a RRC release message to the UE, and the UE moves to RRC_IDLE CM-IDLE state.

Figure 9:
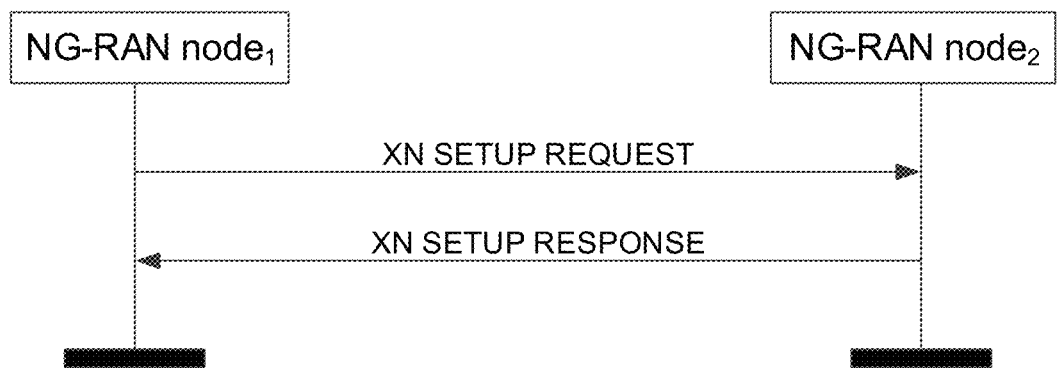
FIG. 9 illustrates an example signaling diagram of an Xn setup procedure, according to an example.

FIG. 9 illustrates an example signaling diagram of an Xn setup procedure. The purpose of the Xn Setup procedure is to exchange application level configuration data needed for two NG-RAN nodes to interoperate correctly over the Xn interface. As shown in the example of FIG. 9, the NG-RAN node1 initiates the procedure by sending the XN SETUP REQUEST message to the candidate NG-RAN node2. The candidate NG-RAN node2 replies with the XN SETUP RESPONSE message. FIG. 10 illustrates an example of some of the information contained in the Xn SETUP request and/or response messages.

It is noted that, the RAN-AreaCode (RANAC), Tracking Area Code (TAC) and NR Cell Global Identifier (CGI) information may be exchanged across neighbours in the Xn setup/response as well as in the configuration update/update acknowledge through the served cell information IE and neighbour cell information IE. This may be necessary for a gNB to acquire the knowledge of the RANAC allocation of neighbour cells and hence the potential association to a common RNA, configured for a UE in RRC_INACTIVE state.

Figure 11:
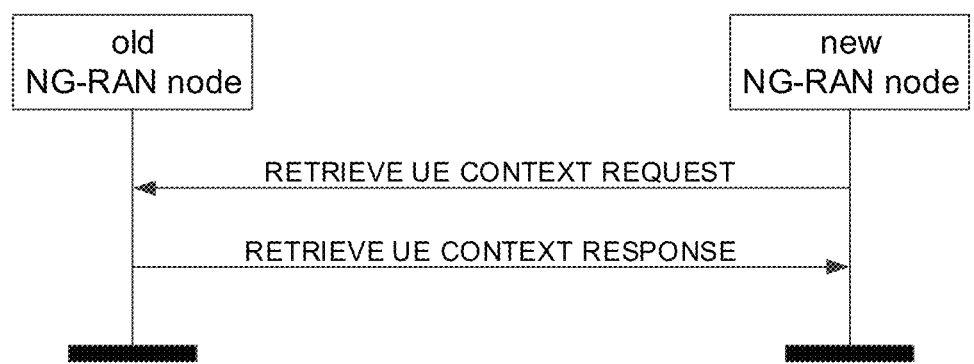
FIG. 11 illustrates an example signaling diagram for an Xn context retrieval procedure, according to an example.

FIG. 11 illustrates an example of a signaling diagram for an Xn context retrieval procedure. In this example, a new NG-RAN node initiates the procedure by sending the RETRIEVE UE CONTEXT REQUEST message to the old NG-RAN node. If the old NG-RAN node is able to identify the UE context by means of the UE context ID, and to successfully verify the UE by means of the integrity protection contained in the RETRIEVE UE CONTEXT REQUEST message, and decides to provide the UE context to the new NG-RAN node, it can respond to the new NG-RAN node with the RETRIEVE UE CONTEXT RESPONSE message. Otherwise, the old NG-RAN node can respond to the new NG-RAN node with the RETRIEVE UE CONTEXT FAILURE message with a specific cause to indicate the reason. For example, the old NG-RAN node can respond to the new NG-RAN node with a radio network layer cause, such as 'unknown old NG-RAN node UE XnAP ID,' 'UE context ID not known,' or 'non-relocation of context'. An 'unknown old NG-RAN node UE XnAP ID' cause means that the action failed because the old NG-RAN node UE XnAP ID or the S-NG-RAN node UE XnAP ID is unknown. A 'UE context ID not known' reason means that the context retrieval procedure cannot be performed because the UE context cannot be identified. A 'non-relocation of context' reason means that the context retrieval procedure is not performed because the old RAN node has decided not to relocate the UE context.

A UE in RRC_INACTIVE state may perform two forms of RNA Updates (RNAU). One form is RNA crossing event-triggered RNAU when the UE re-selects a cell outside its configured RNA which involves a UE context relocation in the target gNB. Another form is periodic RNAU when the UE is still within its configured RNA which may not require a context relocation. It is performed according to the network defined timer (PeriodicRNAU-TimerValue).

It is noted that the UE does not inform explicitly about the RNA crossing event, and the target cell cannot distinguish between an RNA update due to an RNA crossing or a periodic update, since it is unaware of the UE's RNA. Rather, the anchor gNB upon receiving the UE context retrieve request from the target gNB, can discriminate that and decide whether to relocate the UE context or not.

The UE context retrieval procedure includes the request and response (or failure) messages that are exchanged over the Xn interface and leads to a certain delay. This delay depends primarily on the Xn connectivity (latency) between the involved gNBs, which in turn depends on the size of the RNA. The bigger the RNA, the larger the distance is between a gNB located at the edge of the RNA and the anchor cell, thus the larger would be the context retrieve delay.

In the context of some example embodiments, the UE may be configured with such large RNA (i.e., involving several cells) to minimize the RNAU rate (and associated signaling overhead). Additionally, there should be Xn connectivity within the gNBs belonging to the same RNA. The gNBs belonging to an RNA are expected to be connected via the Xn interface because this is an essential feature for ensuring both successful context retrieval and RAN-level paging. This cannot be ensured unless RNAs for all the UEs in a given PLMN are configured consistently. In an embodiment, there may be direct Xn connectivity between neighbor gNBs. However, there may not be (a sufficient) Xn connectivity between gNBs across different RNAs. When the RNA is large, the target cell (outside the RNA) may be far away from the anchor cell, e.g., more than one Xn link away, making it unfeasible to retrieve the context since the standardized procedure assumes a single Xn link, i.e., direct Xn connectivity.

Therefore, there may be a large risk that a target cell outside the RNA may not be able to resolve the anchor gNB ID or to locate and/or retrieve the UE context successfully. Therefore, there may be a large risk of context retrieval failure and, consequently, the RRC connection will have to be released and the UE will be moved to the RRC_IDLE state. This means, in turn, that the UE would establish an RRC/NAS connection and the user-plane sessions from scratch, which leads to a large delay, signalling and UE power consumption. In deployments or configurations in which RNA crossing is frequent, this delay, signaling and power consumption, can be a problem.

Certain embodiments described herein provide systems and methods to minimize the risk of unsuccessful context retrieval procedures that may occur upon crossing the RNA border and performing a RNAU and, therefore, can avoid the signalling, latency and power consumption associated with the establishment of a new RRC connection from scratch.

Once the RRC connection is suspended, the UE receives a release message with a suspension indication containing the UE specific RNA, which comprises one or more cells ID(s), or list of RAN Areas which include a Tracking Area Code (TAC) and optionally a list of RAN area Codes (RANACs). It is noted that distinct RNA configurations may be composed for distinct UEs, e.g., according to their mobility patterns.

The configuration considered according to certain embodiments may be based on a list of RAN areas as per RNA configuration, but any other configuration can be used. In some embodiments, the cell identity or identities, RANAC(s), and the TAC(s) are exchanged between cells during the Xn setup procedure and broadcasted in System Information (SI).

While in RRC_INACTIVE state, the UE will acquire in the SI, information relevant for the UE to evaluate whether it may access to a cell and continue to perform the RRC_INACTIVE state mobility procedures. In particular, the UE can receive, in SIB 1, the cell identity, RANAC and TAC associated to the serving cell which are compared to the stored RNA configuration. If matched information, the UE considers the serving cell to belong to its configured RNA. Otherwise, the UE considers the serving cell to be out of its RNA and therefore triggers an event-trigger RNAU procedure, the event being the RNA border crossing.

One approach to avoid unsuccessful context retrieval would be to transfer the UE context to all of the gNBs of the same RNA, but this would be costly in terms of signalling overhead and particularly inefficient with large RNA configurations and when many UEs are in RRC Inactive mode.

As will be discussed herein, certain example embodiments may be directed to determining whether a receiving gNB requests the context relocation or not based on its location inside the UE's configured RNA. This can be done even when the knowledge related to the UE is not available.

Certain example embodiments provide a method that enables a target gNB to send assistance information to the anchor gNB to aid the anchor node's decision on whether to relocate the UE context within the same RNA or not. As a result, some embodiments can minimize the relocation events (and associated signalling) for those gNBs located at the edge of the UE's RNA.

According to certain example embodiments, the assistance information can be provided in at least two forms. In one option, the assistance information may be in the form of an indication of the target gNB being an "RNA edge node" sent by the target gNB to the anchor gNB. In another option, the assistance information may be in the form of the list of RANAC assignment of the neighbor gNBs of the target gNB.

According to an embodiment where the assistance information is in the form of an indication of the target gNB being an "RNA edge node" sent by the target gNB to the anchor gNB, a gNB can mark itself as an "RNA edge node" based on the options described below.

In an embodiment, the "RNA edge node" marking condition may be determined at the target gNB based on the RANAC assignment of its neighbor gNBs irrespective of the actual UE's configured RNA. For example, a gNB assigned with RANAC2 can identify itself at a potential edge of the RNA for a given UE, if it has direct Xn connectivity with a gNB that has a RANAC3 different from RANAC2 and RANAC1 of the anchor gNB. This estimate may lead to erroneously identifying an RNA edge node, when the RNA includes multiple RANACs. This can be mitigated when knowing the RNA construction rules, which should be consistently applied for all UEs in the entire PLMN. For instance, the edge marking condition described in the example above is correct if an RNA can include a maximum of 2 RANACs. Then, the UE's RNA would have included RANAC1 of the anchor gNB and RANAC 2 of target gNB, making obvious that RANAC3 would be outside the RNA.

According to an embodiment, the "RNA edge node" marking condition may be determined at the target gNB based on the RANAC assignment of its neighbor gNBs and while taking into account the actual UE configured RNA. The UE can be configured to provide its actual RNA configuration to the target gNB (e.g., in/along with the RRC resume request message). The UE can report full or part of its stored RNA information. The part of the RNA to be reported could exclude at least the RANAC of the target gNB and the RANAC of the anchor gNB. For example, if the UE was moved to RRC_INACTIVE state in a cell that belongs to RANAC1 and configured with an RNA that contains {RANAC1, RANAC2, RANAC3}, then the UE would only report {RANAC3} when resuming in a cell that belongs to RANAC2. If the target gNB has direct Xn connectivity with at least one other gNB that is associated with a RANAC not part of the UE's configured RNA (i.e., not reported by the UE), the target gNB can be deemed to be at the edge of the RNA. Thus, if there is no entire matching between the UE reported RANACs and neighbors' RANACs, the target gNB could identify itself as the RNA edge node.

In an embodiment, the "RNA edge node" marking condition of a target gNB may be determined by the UE and signaled to the target gNB. For example, the UE can be configured to monitor whether a gNB is at the edge of its configured RNA based on its history and local learning. If so, the UE will report a flag or indication (e.g., in/along with the RRC resume request message) to inform the target gNB that it is at the edge of the UE's RNA. For instance, if after visiting a target gNB within the RNA, the UE has encountered in the past crossing the RNA border after a subsequent cell reselection, it may assume that this target gNB is at the edge of this RNA. The gNB may provide the indication of "RNA edge node" to the anchor gNB as part of the context retrieve procedure. According to one example, a "RNA_EDGE_NODE" flag can be added as a new optional IE in the Xn-AP Retrieve Context Request message when the RNA edge marking condition is met for a given UE in RRC_INACTIVE state. When receiving the "RNA edge node" indication, the anchor gNB may relocate the UE context. Otherwise, the anchor gNB will not relocate the context.

As introduced above, in one embodiment, the assistance information may be in the form of the list of RANAC assignment of the neighbor gNBs of the target gNB. Based on the received list, the anchor gNB may determine whether the target gNB is at the edge of the UE's RNA. If the target gNB has neighbor gNBs that belong to different RANAC(s)

not part of the UE's configured RNA, the anchor gNB may relocate the context. As an example, if the UE was moved to RRC_INACTIVE state in a cell that belongs to {RANAC1} and configured with an RNA that contains {RANAC1, RANAC2} and if the target has reported that its neighbor gNBs belong to {RANAC1, RANAC3}, then the anchor gNB can consider the target gNB as RNA edge node since {RANAC3} is not part of the UE's configured RNA. The list of RANACs to be reported could exclude the RANAC of the RANAC of the anchor gNB. This assistance information can be, for example, a new optional IE in the Xn-AP Retrieve Context Request message.

It is noted that the target gNB may send the assistance information to the anchor gNB at periodic RNAUs since for these, the context relocation may not be performed, irrespective of the used option. To support that, an embodiment provides that the UE assists the target gNB to distinguish between periodic RNAU and RNA-crossing based RNAU. In example embodiments where the "RNA edge node" marking condition is determined at the target gNB based on the RANAC assignment of its neighbor gNBs irrespective of the actual UE's configured RNA or the assistance information is in the form of the list of RANAC assignment, the UE can report an indication for RNA-crossing based RNAUs. The absence of such indication can indicate a periodic RNAU. For example, the UE can include, in the RRC resume request message, such an indication for RNA-crossing based RNAUs. Alternatively, the resume cause could indicate whether the RNA update is due to the expiry of the periodic timer (e.g., by using the legacy "ma-Update" resume cause value) or an RNA crossing event (e.g., by using a new "ma-crossing-Update" resume cause value). In example embodiments where the "RNA edge node" marking condition is determined at the target gNB based on the RANAC assignment of its neighbor gNBs while taking into account the actual UE configured RNA or the "RNA edge node" marking condition of a target gNB is determined by the UE, the presence of the reporting of the UE assistance information related to RNA/RNA edge node condition to the target cell indicates a periodic RNAU.

Figure 12:
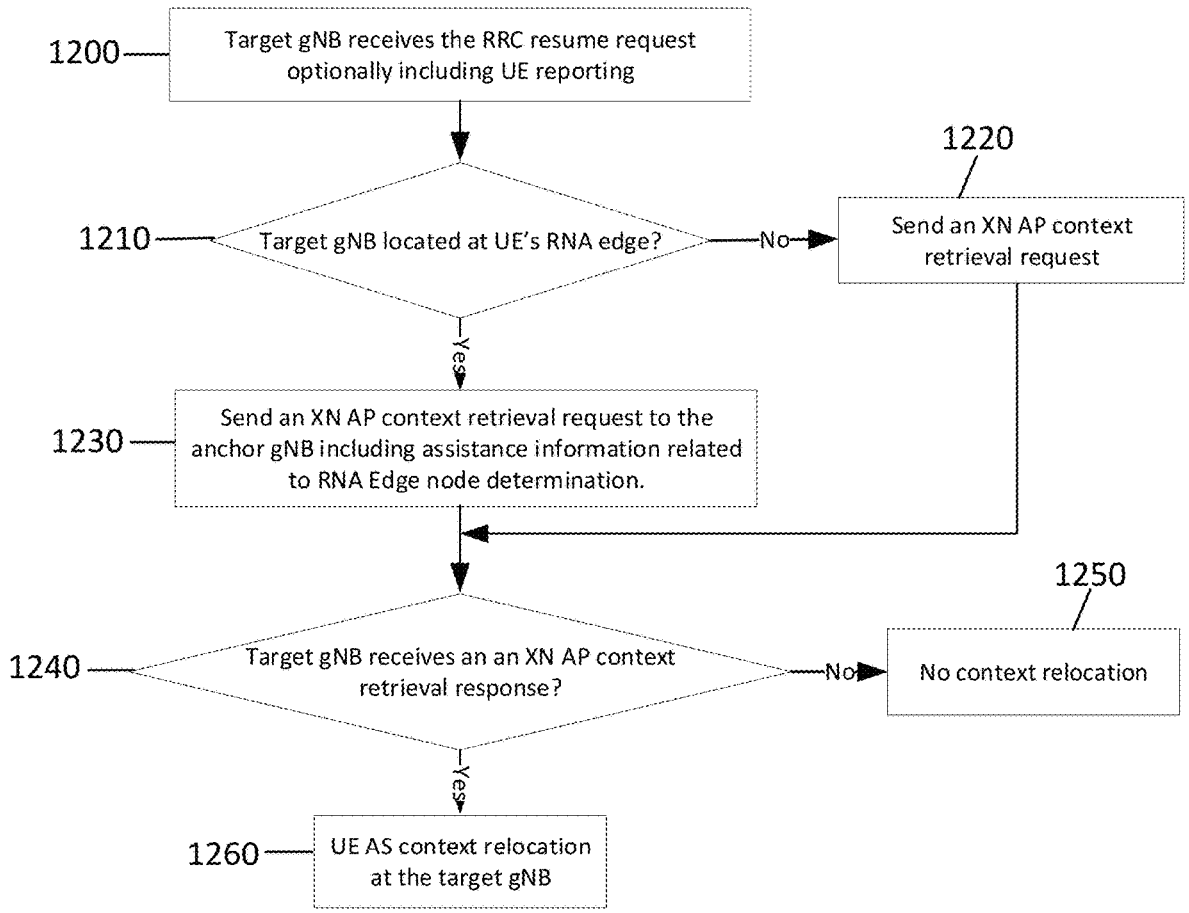
FIG. 12 illustrates an example flow chart of a method, according to an embodiment.

FIG. 12 illustrates an example flow chart of a method in which RNA edge determination may be performed at the target gNB and indicated to the anchor gNB through a context retrieve procedure, according an embodiment. In certain example embodiments, the flow diagram of FIG. 12 may be performed by a network entity or network node in a communications system, such as LTE or 5G NR. In some example embodiments, the network entity performing the method of FIG. 12 may include a base station, access node, node B, eNB, gNB, NG RAN node, or the like. For instance, in one example embodiment, the method of FIG. 12 may be performed by a target gNB, such as the gNB or NG RAN node depicted in the example diagrams of FIGS. 5-11.

As illustrated in the example of FIG. 12, at 1200, a target gNB may receive a RRC resume request message from a UE. In an embodiment, the RRC resume request may optionally include the UE assistance information and the target gNB may determine whether the RNAU is timer-based (i.e., periodic RNAU). In certain embodiments, the method may include, at 1210, the target gNB determining whether it is located at the UE's RNA edge. If the target gNB determines that it is located at the UE's RNA edge and therefore the context relocation is desired, the method may include, at 1230, sending an Xn AP context retrieval request to the anchor gNB including assistance information related to RNA edge node determination. For instance in an embodiment, the sending 1230 may include the target gNB indicating it is located at RNA edge by sending the "RNA edge node" indication along with the Xn AP retrieve UE context request to the anchor cell. In another embodiment, the sending 1230 may include the target gNB sending the list of RANAC assignment of its neighbor gNBs along with the Xn AP retrieve UE context request to the anchor cell. If the target gNB determines that it is not located at the RNA edge, the method may include, at 1220, sending a regular Xn AP retrieve UE context request to the anchor cell.

As further illustrated in the example of FIG. 12, in response to sending an Xn AP context retrieval request to the anchor gNB, the method may include, at 1240, determining whether an Xn AP context retrieval response is received. If a Xn AP context retrieval response is received (i.e., "yes" in the example of FIG. 12), then, at 1260, the UE AS context is relocated at the target gNB. If Xn AP context retrieval failure is received (i.e., "no" in the example of FIG. 12), then, at 1250, the context is not relocated.

Figure 13:
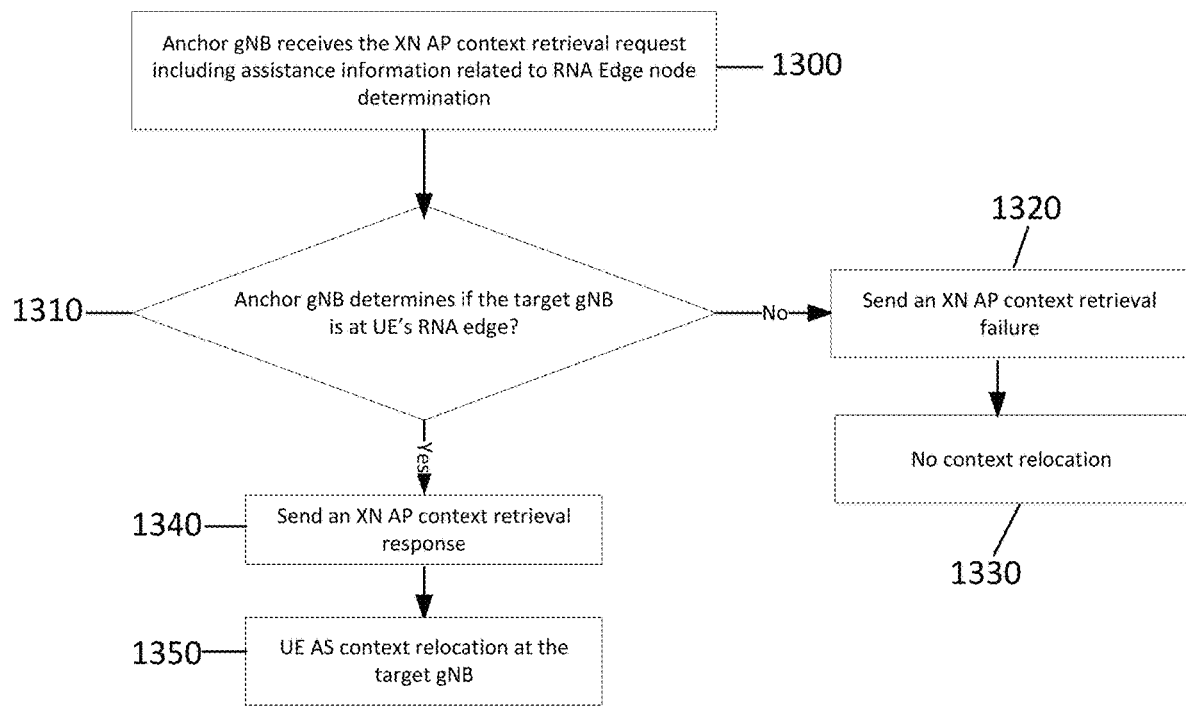
FIG. 13 illustrates an example flow chart of a method, according to an embodiment.

FIG. 13 illustrates an example flow chart of a method in which RNA edge determination may be performed at the anchor gNB using the target gNB assistance information, according to an embodiment. In certain example embodiments, the flow diagram of FIG. 13 may be performed by a network entity or network node in a communications system, such as LTE or 5G NR. In some example embodiments, the network entity performing the method of FIG. 13 may include a base station, access node, node B, eNB, gNB, NG RAN node, or the like. For instance, in one example embodiment, the method of FIG. 13 may be performed by an anchor gNB, such as the last serving gNB or NG RAN node depicted in the example diagrams of FIGS. 5-11.

As illustrated in the example of FIG. 13, at 1300, an anchor gNB may receive an Xn AP context retrieval request from a target gNB. In an embodiment, the Xn AP retrieve UE context retrieval request from the target gNB may include assistance information related to RNA edge node determination. For example, in one embodiment, the receiving 300 may include receiving, from the target gNB, a list of RANAC assignments of neighbor gNBs along with the Xn AP retrieve UE context request. In another embodiment, the receiving 1300 may include receiving, from the target gNB along with the Xn AP retrieve UE context request, an "RNA edge node" indication to indicate that the target gNB is located at RNA edge. Based on the received assistance information, the method may include the anchor gNB determining whether to relocate the UE context or not. For example, at 1310, the method may include determining if the target gNB is at UE's RNA edge. If it is determined that the target gNB is not at the UE's RNA edge, then the method may include, at 1320, sending an Xn AP context retrieval failure message to the target gNB and, at 1330, not performing context relocation. If it is determined that the target gNB is at the UE's RNA edge, then the method may include, at 1340, sending an Xn AP context retrieval response to the target gNB and, at 1350, relocating the UE AS context.

Figure 14:
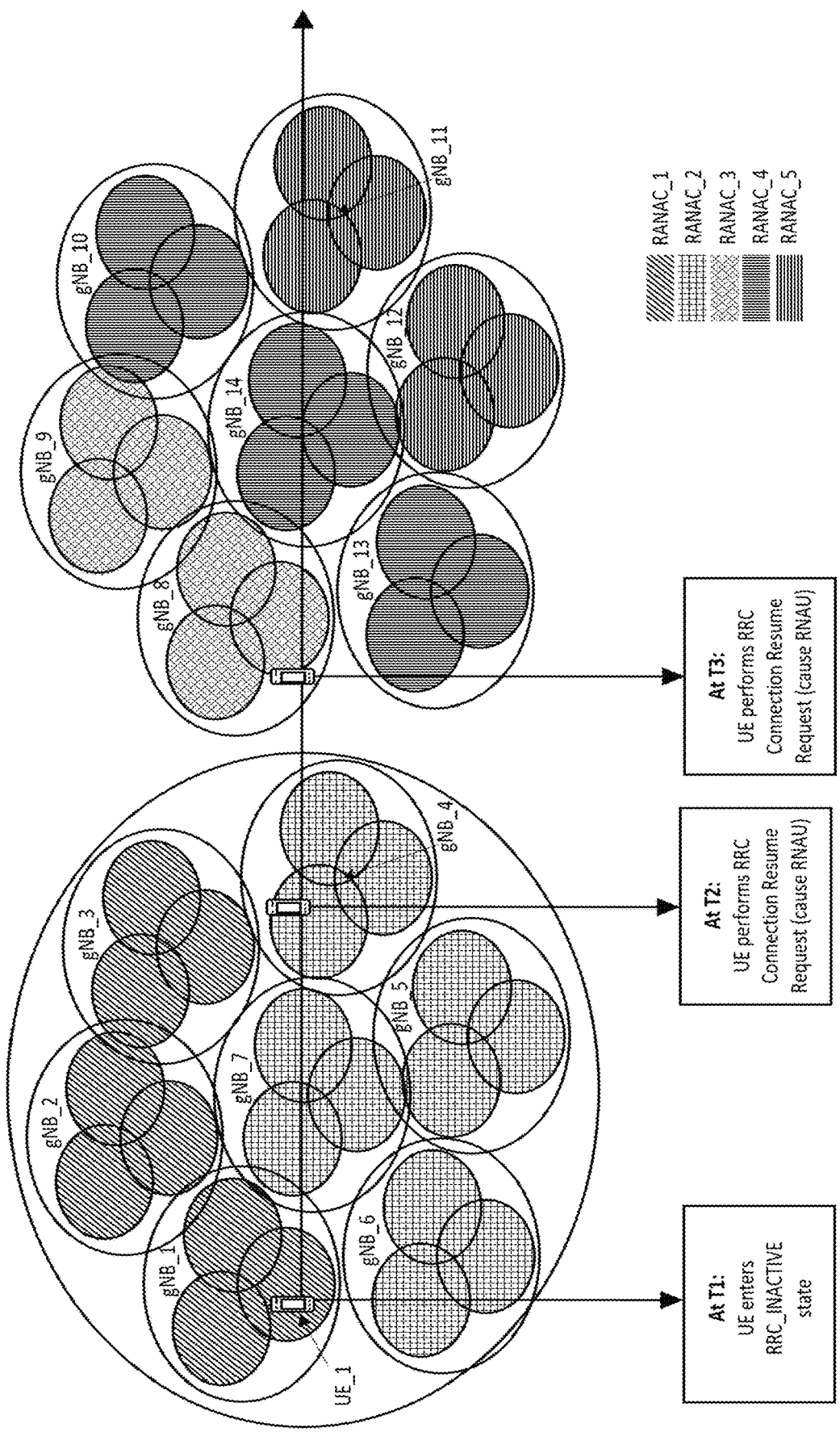
FIG. 14 illustrates a system diagram according to one example embodiment.

FIG. 14 illustrates a system diagram of one example applying certain embodiments described herein. In the example of FIG. 14, it is assumed that the cells served by gNB_1 to gNB_3 belong to RANAC_1, the cells served by gNB_4 to gNB_7 belong to RANAC_2, the cells served by gNB_8 to gNB_9 belong to RANAC_3, the cells served by gNB_10, gNB_13 to gNB_14 belong to RANAC_4, the cells served by gNB_11 to gNB_12 belong to RANAC_5. Furthermore, it is assumed that direct Xn connectivity is available between gNBs that belong to the same RANAC, and that gNB_4 has direct Xn connectivity with gNB_8. In the example of FIG. 14, at time T1, UE1 is assumed to be moved to RRC inactive state in gNB_1 (i.e., anchor gNB) and configured with RNA_1 defined by {RANAC_1, RANAC_2}. At time T2, UE1 initiates a periodic RNAU procedure in gNB_4 inside the configured RNA. At time T3, by reselecting a cell in RANAC_3 (outside RNA_1), UE1 triggers an RNA-crossing event based RNAU update in gNB_8. Thus, in the example of FIG. 14, UE1 is moved to RRC Inactive State from gNB_1 with a RNA including {RANAC_1, RANAC_2}. The UE context relocation for UE1 is made by gNB_4 upon performing a periodic RNAU and determining it is at the edge of the UE's RNA and that is followed by a successful context retrieve from gNB_8.

In some example embodiments, during the Xn setup procedure, gNB(s) may receive information from neighboring gNB(s) directly connected over Xn with their corresponding RANAC(s). For instance, referring to the example of FIG. 14, gNB_4 may receive information from gNB_1, gNB_2 and gNB_3 that belong to RANAC_1, from gNB_5, gNB_6 and gNB_7 that belong to RANAC_2, and from gNB_8 that belongs to RANAC_3. At time T2, when receiving the RNAU request from UE_1, gNB_4 may determine the anchor gNB_ID (i.e., gNB_1) and to which RANAC it belongs (i.e. RANAC_1).

According to an embodiment where the "RNA edge node" marking condition is determined at the target gNB based on the RANAC assignment of its neighbor gNBs irrespective of the actual UE's configured RNA, based on the resume cause/UE indication (or lack of it), the gNB may assume that the resume request of the UE is due to a periodic RNAU (and not an RNA crossing event-triggered RNAU). For example, gNB_4 may identify itself within the UE's configured RNA. In an embodiment, gNB_4 can identify itself as an RNA edge node since it has a direct Xn connectivity to gNB_8 that belong to {RANAC_3}, different from {RANAC_2} (to which it belongs) and {RANAC_1} (assigned for the anchor gNB).

According to an embodiment where the "RNA edge node" marking condition is determined at the target gNB based on the RANAC assignment of its neighbor gNBs and while taking into account the actual UE configured RNA, UE_1 report its configured RNA, i.e., {RANAC_1, RANAC_2}. Such reporting enables gNB_4 to identify itself within the UE's configured RNA. The target gNB_4 compares the received information to the list of RANAC(s) of its neighboring gNBs {RANAC_1, RANAC_2, RANAC_3}. As RANAC_3 is not part of the UE's configured RNA, gNB_4 can identify itself as an RNA edge node.

According to an embodiment where the "RNA edge node" marking condition of a target gNB is determined by the UE and signaled to the target gNB, UE_1 indicates that the receiving gNB_4 was identified as an edge node for the same configured RNA. Such reporting enables gNB_4 to identify itself within the UE's configured RNA. In an embodiment, gNB_4 may decode the received flag and identifies itself as an RNA edge node.

In some example embodiments, triggered by periodic RNAU, the gNB_4 may send, along with the UE Context Request, the assistance information to the anchor gNB. According to an embodiment where the assistance information is in the form of an indication of "RNA edge node" sent by the target gNB to the anchor gNB, the assistance information may include the flag "RNA_EDGE_NODE". According to an embodiment where the assistance information is in the form of the list of RANAC assignment of the neighbor gNBs of the target gNB, the assistance information may include the list of RANACs, i.e., {RANAC_3} in the example of FIG. 14. As RANAC_3 is not part of the UE's configured RNA, the anchor gNB identifies gNB_4 as an RNA edge node.

According to certain embodiments, the gNB_1 may decide to successfully complete the UE context relocation procedure within the UE's RNA if the target gNB is at the edge of the UE's RNA. A path switch procedure may then be performed by gNB_4 towards the AMF. The UE may be sent back to RRC_INACTIVE state by gNB_4 which provides a new I-RNTI (i.e. RNTI_2) that identifies both the UE and its new anchor gNB_4. The UE AS context is then released at gNB_1. When crossing the RNA_1 border and selecting a cell served by gNB_8, the UE may trigger once again an RNA update procedure, due to the RNA crossing event. The UE context can then be retrieved from a direct neighbor gNB_4, rather than the gNB_1 where the RRC connection was originally suspended. This leads to reducing the context retrieval delay and minimizing the retrieval failures.

Figure 15:
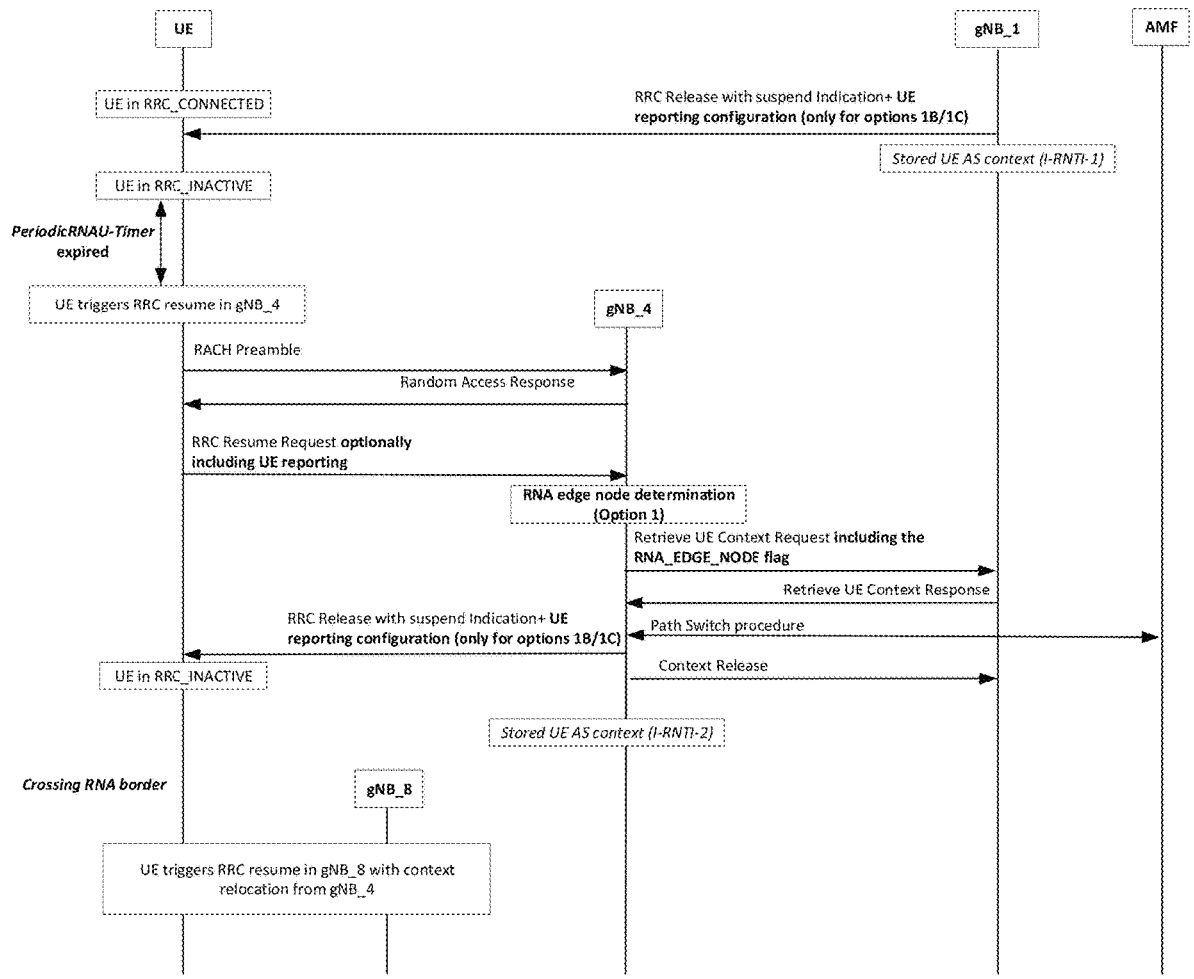
FIG. 15 illustrates an example signaling flow diagram, according to an embodiment.
Figure 16:
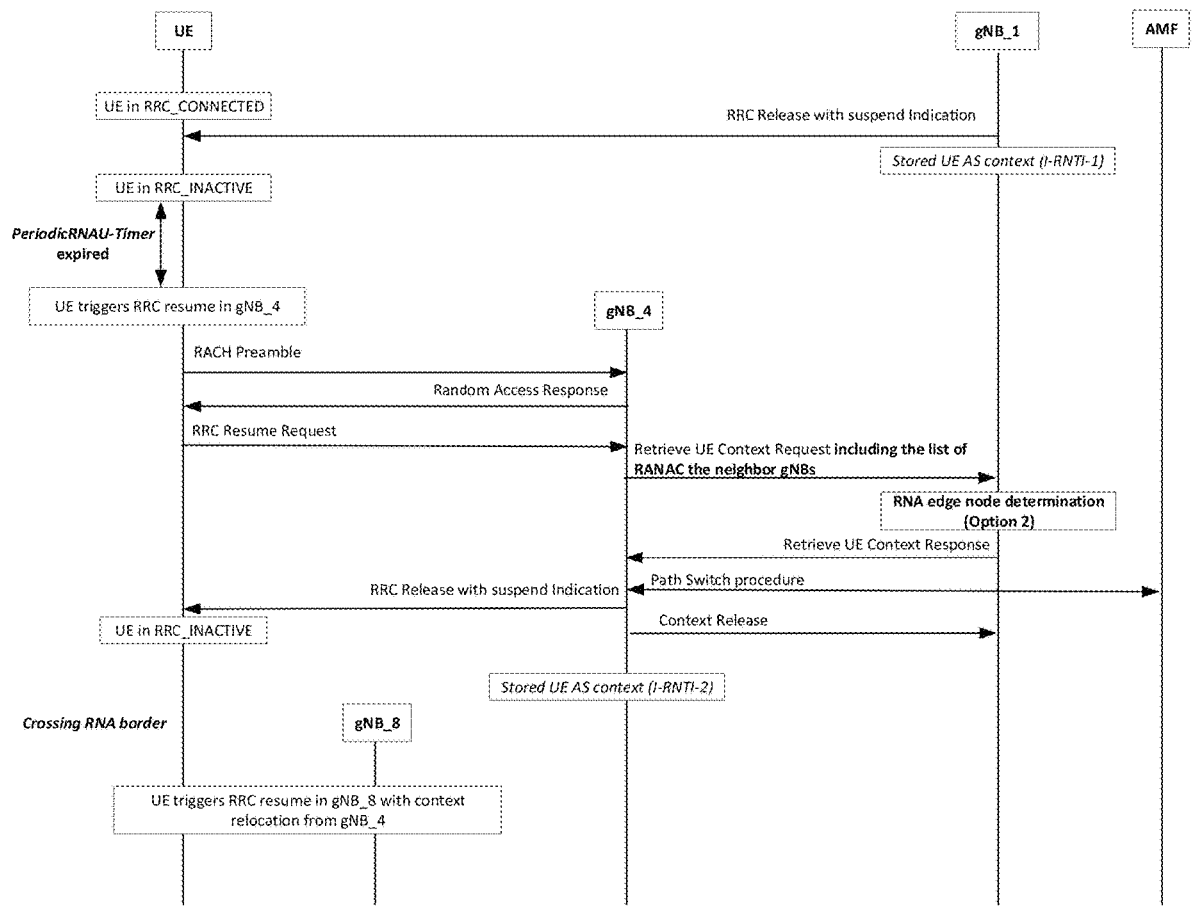
FIG. 16 illustrates an example signaling flow diagram, according to an embodiment.

FIGS. 15 and 16 illustrate example signaling flow diagrams for a UE moving according to the example of FIG. 14, pursuant to certain embodiments. FIG. 15 illustrates an example signaling flow for an option (e.g., identified as option 1 in FIG. 15) in which the assistance information is in the form of an indication of "RNA edge node" sent by the target gNB (gNB_4) to the anchor gNB (gNB_1). In the example of FIG. 15, the target gNB, gNB_4, identifies itself as an RNA edge node and sends the assistance information to the anchor gNB, gNB_1, in the form of an edge node indication. In this example, gNB_1 may decide to relocate the UE context for UE_1.

FIG. 16 illustrates an example signaling flow for an option (e.g., identified as option 2 in FIG. 16) in which the assistance information is in the form of the list of RANAC assignment of the neighbor gNBs of the target gNB. In the example of FIG. 16, the target gNB (gNB_4) may send the assistance information to the anchor gNB (gNB_1) in the form of list RANAC associated to its neighbor gNBs. The anchor gNB_1 may determine that gNB_4 is an RNA edge node for UE_1 and perform context relocation.

FIG. 17a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be NG-RAN node, an eNB in LTE, or gNB in 5G. According to an embodiment, apparatus 10 may include or may represent a target network node, target gNB, or new NG-RAN node as discussed elsewhere herein and illustrated in the examples of FIGS. 5-11 and/or FIGS. 14-16.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 17a.

As illustrated in the example of FIG. 17a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 17a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources. In certain examples, processor 12 may be configured as a processing means or controlling means for executing any of the procedures described herein.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein. In certain example embodiments, memory 14 may be configured as a storing means for storing any information or instructions for execution as discussed elsewhere herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. In certain example embodiments, transceiver 18 may be configured as a transceiving means for transmitting or receiving information as discussed elsewhere herein. Additionally or alternatively, in some embodiments, apparatus 10 may include an input and/or output device (I/O device) or means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. For example, in some embodiments, apparatus 10 may be configured to perform one or more of the processes depicted in any of the flow charts or signaling diagrams described herein. For instance, in one embodiment, apparatus 10 may be configured to perform at least the flow diagram illustrated in the example of FIG. 12. In some embodiments, as discussed herein, apparatus 10 may be configured to perform a procedure relating to providing assistance information to aid in UE context relocation, for instance.

In an embodiment, apparatus 10 may be controlled by memory 14 and processor 12 to acquire assistance information related to relocation of a UE context of a UE in RRC_INACTIVE state, where the relocation is based at least on a RNA of the UE. According to certain embodiments, apparatus 10 may be controlled by memory 14 and processor 12 to receive an indication, such as a resume request message (e.g., RRC resume request) from the UE. In one embodiment, the resume request message may include an indication, from the UE, indicating that the apparatus 10 is at a RNA edge of the UE. In some embodiments, the resume request message may include user equipment assistance information. For instance, in an embodiment, the user equipment assistance information may include an actual RNA configuration of the user equipment. The actual RNA configuration may include full or part of the RNA information stored at the UE.

In an embodiment, apparatus 10 may be controlled by memory 14 and processor 12 to determine, e.g., based on the assistance information related to the relocation of the UE, whether apparatus 10 is located at the RNA edge of the UE. According to one example embodiment, to determine whether apparatus 10 is located at the RNA edge of the UE, apparatus 10 may be controlled by memory 14 and processor 12 to determine based on the RANAC assignment of network nodes neighboring the apparatus 10 irrespective of the configured RNA of the UE. In a further embodiment, to determine whether apparatus 10 is located at the RNA edge of the UE, apparatus 10 may be controlled by memory 14 and processor 12 to determine based on the RANAC assignment of network nodes neighboring the apparatus 10 while taking into account the configured RNA of the UE. In certain embodiments, when the apparatus 10 has direct Xn connectivity with at least one other network node associated with a RANAC that is not part of the actual RNA configuration of the UE, apparatus 10 is considered to be located at the RNA edge of the UE.

In an embodiment, when it is determined that the apparatus 10 is located at the RNA edge of the UE, apparatus 10 may be controlled by memory 14 and processor 12 to provide or send assistance information related to RNA edge node determination to an anchor network node. According to an embodiment, the assistance information may be sent to the anchor network node as part of a context retrieve procedure. In some embodiments, the assistance information may include an indication, to the anchor network node, that the apparatus 10 is a RNA edge node. In certain embodiments, the assistance information provided to the anchor network node may include a list of RANAC assignments of neighboring network nodes to the apparatus 10. According to an embodiment, the assistance information may be provided to the anchor network node at one or more periodic RNAUs. In one embodiment, an absence of an indication from the UE for RNA-crossing based RNAUs indicates periodic RNAU. According to another embodiment, the receiving of the UE assistance information related to RNA edge node condition indicates periodic RNAU. In a further embodiment, when it is determined that the apparatus 10 is not located at RNA edge, apparatus 10 may be controlled by memory 14 and processor 12 to transmit a regular retrieve user equipment context request to the anchor network node, e.g., by omitting the provision of the assistance information to the anchor network node.

FIG. 17*b* illustrates an example of an apparatus 20 according to another embodiment. In an embodiment, apparatus 20 may be a node, host, or server in a communications network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 20 may be NG-RAN node, an eNB in LTE, or gNB in 5G. According to an embodiment, apparatus 20 may include or may represent an anchor network node, anchor or last serving gNB, or old NG-RAN node as discussed elsewhere herein and illustrated in the examples of FIGS. 5-11 and/or FIGS. 14-16.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 17*b*.

As illustrated in the example of FIG. 17*b*, apparatus 20 may include or be coupled to a processor 22 for processing information and executing instructions or operations. Processor 22 may be any type of general or specific purpose processor.

In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 17*b*, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally, or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 or apparatus 30 via a wireless or wired communications link or interface 70 according to any radio access technology, such as NR.

According to some embodiments, processor 22 and memory 24 may be included in or may form a part of processing circuitry/means or control circuitry/means. In addition, in some embodiments, transceiver 28 may be included in or may form a part of transceiving circuitry or transceiving means.

As discussed above, according to some embodiments, apparatus 20 may be or may include a network nod or RAN node, such as a satellite, base station, NG-RAN node, a Node B, an evolved Node B (eNB), 5G Node B or access point, next generation Node B (NG-NB or gNB), and/or WLAN access point, associated with a radio access network, such as a LTE network, 5G or NR. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 13, 15 or 16. In certain embodiments, apparatus 20 may include or represent an anchor network node or anchor gNB, for example. According to an embodiment, apparatus 20 may be configured to perform a procedure relating to UE context relocation, for instance.

In certain embodiments, apparatus 20 may be controlled by memory 24 and processor 22 to receive, from a target network node or gNB, a context retrieval request that may include assistance information related to radio access network (RAN) notification area (RNA) edge node determination. According to an embodiment, based on the assistance information, apparatus 20 may be controlled by memory 24 and processor 22 to determine whether to relocate a user equipment context. In some example embodiments, the assistance information may include an indication that the target network node is a RNA edge node. According to further example embodiments, the assistance information may include a list of RANAC assignments of network nodes neighboring the target network node. In some example embodiments, the assistance information may be received at one or more periodic RNAUs.

In some example embodiments, to determine whether to relocate the user equipment context comprises apparatus 20 may be controlled by memory 24 and processor 22 to determine, using the assistance information, whether the target network node is at a RNA edge of the UE. According to an embodiment, when the target network node is at the RNA edge of the UE, apparatus 20 may be controlled by memory 24 and processor 22 to relocate the user equipment context. In an embodiment, when the target network node is not at the RNA edge of the user equipment, apparatus 20 may be controlled by memory 24 and processor 22 to not relocate the user equipment context.

FIG. 17c illustrates an example of an apparatus 30 according to another example embodiment. In an example embodiment, apparatus 30 may be a node or element in a communications network or associated with such a network, such as a UE, mobile equipment (ME), mobile station, mobile device, stationary device, sensor, IoT device, TSN device, or other device. As described herein, UE may alternatively be referred to as, for example, a mobile station, mobile equipment, mobile unit, mobile device, user device, subscriber station, wireless terminal, tablet, smart phone, IoT device or NB-IoT device, a connected car or vehicle, or other connected device, or the like. As one example, apparatus 30 may be implemented in, for instance, a wireless handheld device, a wireless plug-in accessory, or the like.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 17c.

As illustrated in the example of FIG. 17c, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 17c, multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally, or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing means and/or processing circuitry or control means and/or control circuitry. In addition, in some example embodiments, transceiver 38 may be included in or may form a part of transceiving means and/or transceiving circuitry.

As discussed above, according to some example embodiments, apparatus 30 may be a UE, mobile device, mobile station, ME, sensor, IoT device, TSN device, NB-IoT device, and/or other connected device, for example. According to certain example embodiments, apparatus 30 may be controlled by memory 34 and processor 32 to perform the functions associated with example embodiments described herein. For instance, in some example embodiments, apparatus 30 may be configured to perform one or more of the processes depicted in any of the diagrams or signaling flow diagrams described herein. As an example, apparatus 30 may correspond to or represent a UE, such as one or more of the UE(s) illustrated in the examples of FIG. 5-8 or 14-16. According to certain example embodiments, apparatus 30 may be configured to perform a procedure relating to aiding in UE context relocation, for instance.

According to an example embodiment, apparatus 30 may be controlled by processor 32 and memory 34 to provide its RNA configuration to a target network node or gNB. For instance, in an embodiment, apparatus 30 may be configured to provide its actual RNA configuration to the target network node, e.g., in or along with a RRC resume request message. In certain embodiments, apparatus 30 may be controlled by processor 32 and memory 34 to provide the full or part of its stored RNA information. According to an embodiment, the part of the RNA reported may exclude at least the RANAC of the target network node and the RANAC of the anchor network node.

In a further embodiment, apparatus 30 may be controlled by processor 32 and memory 34 to determine the RNA edge node condition of a target network node and to signal the RNA edge node condition to the target network node. For instance, in an embodiment, apparatus 30 may be controlled by processor 32 and memory 34 to monitor whether a target network node is the edge of the configured RNA of apparatus 30 based on its history and/or local learning. If the target network node is at the RNA edge of apparatus 30, then apparatus 30 may be controlled by processor 32 and memory 34 to flag or indicate, e.g., in or along with a RRC resume request message, to the target network node that it is at the edge of the RNA of apparatus 30. For example, if after visiting a target network node within the RNA, apparatus 30 has encountered in the past crossing the RNA border after subsequent cell reselection, apparatus 30 may be configured to assume that the target network node is at the edge of the RNA.

According to some example embodiments, apparatus 30 may be configured to assist a target network node to distinguish between periodic RNAU and RNA-crossing based RNAU. In an embodiment, apparatus 30 may be controlled by processor 32 and memory 34 to report an indication for RNA-crossing based RNAUs, where the absence of such an indication may indicate periodic RNAU. In one example, this indication may be included in an RRC resume request message. Alternatively, or additionally, the resume request message may indicate whether the RNA update is due to the expiry of a periodic timer or an RNA crossing event. According to one embodiment, the resume request message may include a cause value to indicate the cause of the RNA update, i.e., whether due to expiry of the periodic timer or the RNA crossing event. In a further embodiment, the presence of the reporting of the assistance information related to RNA/RNA edge node condition to the target cell indicates periodic RNAU.

Furthermore, it should be noted that an apparatus, according to certain example embodiments, may include means or functions for performing any of the procedures described herein.

Therefore, certain example embodiments provide several technological improvements, enhancements, and/or advantages over existing technological processes and constitute an improvement at least to the technological field of wireless network control and management. For example, as discussed in detail in the foregoing, certain example embodiments provide methods of UE context relocation that can enable a target gNB to send assistance information to an anchor gNB to aid in the anchor gNB's decision on whether to relocate the UE context within the same RNA or not. As a result, in addition to any benefits discussed elsewhere herein, example embodiments minimize relocation events and associated signaling for gNBs located at the edge of the UE's RNA. In addition, an advantage of certain embodiments includes avoiding the risk that the UE moves to RRC_IDLEstate and therefore would require a new RRC connection establishment (that may happen at RNA crossing after a context retrieval failure). Rather, when employing example embodiments described herein, the usage of RRC_INACTIVE state can be maintained and so its benefits. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

AMF Access and Mobility Management Function
AS Access Stratum
CN Core Network
CP Control plane
NR New Radio PDCCH Physical Downlink Control Channel
RAN Radio Access Network
RNA RAN Notification area
RNAU RAN Notification area Update
RRC Radio Resource Control protocol
SDT Small Data Transmission
UE User Equipment
UP User Plane
UPF User Plane Function
X2 X2 network interface
Xn Xn network interface.

We claim:

1. An apparatus, comprising: at least one processor; and at least one memory storing instructions, that when executed by the at least one processor, cause the apparatus at least to:
receive, from the user equipment, a first assistance information related to relocation of a user equipment context of a user equipment in radio resource control inactive state;
determine a second assistant information related to the relocation of the user equipment context; and
provide the second assistance information related to the relocation of the user equipment context to an anchor network node,
wherein the second assistance information includes information to determine whether the target network node is located at the edge of radio access network notification area configured for the user equipment, and
wherein the apparatus forms at least part of a target network node.

2. The apparatus according to claim 1, wherein the first assistance information comprises one of: an indication that the target network node is at an edge of a radio access network notification area configured for the user equipment; or an actual radio access network notification area configuration of the user equipment.

3. The apparatus according to claim 1, wherein the actual radio access network notification area configuration comprises full or part of the radio access network notification area information stored at the user equipment.

4. The apparatus according to claim 2, wherein, when the target network node has Xn connectivity with at least one other network node associated with a radio access network area code that is not part of the actual radio access network notification area configuration of the user equipment, the target network node is considered to be located at radio access network notification area edge of the user equipment.

5. The apparatus according to claim 1, wherein the first assistant information is received in a resume request message from the user equipment.

6. The apparatus according to claim 1, wherein the information to determine whether the target network node is located at the edge of radio access network notification area configured for the user equipment comprises at least one of: an indication that the target network node is at an edge of a radio access network notification area configured for the user equipment; a list of radio access network area code assignments of neighbor network nodes of the target network node.

7. The apparatus according to claim 1, wherein the second assistance information is transmitted in a context retrieval request message to request a context relocation.

8. The apparatus according to claim 1, wherein the providing of the second assistance information comprises the at least one memory and computer program code configured, with the at least one processor, to cause the apparatus at least to: send the second assistance information to the anchor network node at one or more periodic radio access network notification area updates.

9. The apparatus according to claim 1, further comprising the at least one memory is storing instructions, that when executed by the at least one processor, cause the apparatus at least to: determine whether the target network node is located at the edge of radio access network notification area configured for the user equipment based on radio access network area code assignment of network nodes neighboring the target network node.

10. An apparatus, comprising: at least one processor; and at least one memory comprising computer program code, the at least one memory and computer program code configured, with storing instructions, that when executed by the at least one processor, cause the apparatus at least to:
receive, from a target network node, assistance information related to relocation of a user equipment context of a user equipment in radio resource control inactive state; and
determine whether to relocate the user equipment context to the target network node based at least in part on the assistance information,
wherein provided second assistance information includes information is to determine whether the target network node is located at the edge of radio access network notification area configured for the user equipment, and
wherein the apparatus forms at least part of an anchor network node.

11. The apparatus according to claim 10, wherein the assistance information comprises at least one of: an indication that the target network node is at edge of a radio access network notification area configured for the user equipment; a list of radio access network area code assignments of neighbor network nodes of the target network node.

12. The apparatus according to claim 10, wherein the assistance information is received in a context retrieval request message.

13. The apparatus according to claim 10, further comprising the at least one memory is storing instructions, that when executed by the at least one processor, cause the apparatus at least to: when the target network node is at the edge of a radio access network notification area configured for the user equipment, relocate the user equipment context to the target network node.

14. The apparatus according to claim 10, wherein the receiving comprises the at least one memory and computer program code configured, with the at least one processor, to cause the apparatus at least to: receive the assistance information at one or more periodic radio access network notification area updates.

15. An apparatus, comprising: at least one processor; and at least one memory storing instructions, that when executed by the at least one processor, cause the apparatus at least to:
provide, to a target network node, at least one of: partial or full radio access network notification area configuration of the apparatus or assistance information relating to whether the target node is at edge of an radio access network notification area configured for the user equipment,
wherein provided second assistance information includes information is to determine whether the target network node is located at the edge of radio access network notification area configured for the user equipment; and
wherein the apparatus forms at least part of a user equipment.

16. The apparatus according to claim 15, further comprising the at least one memory is storing instructions, that when executed by the at least one processor, cause the apparatus at least to: monitor whether the target network node is at the edge of the radio access network notification area configured for the user equipment based on a history or local learning at the user equipment; when it is determined that the target network node is at the edge of the radio access network notification area configured for the user equipment, the assistance information comprises indicating or flagging to the target network node that it is at the edge of the radio access network notification area configured for the user equipment.

17. The apparatus according to claim 15, wherein the assistant information is transmitted in an RRC resume request message.

18. The apparatus according to claim 17, wherein the resume request message indicates whether the radio access network notification area update is due to the expiry of a periodic timer or an radio access network notification area crossing event.

19. The apparatus according to claim 15, further comprising the at least one memory is storing instructions, that when executed the at least one processor, cause the apparatus at least to: assist the target network node to distinguish between periodic radio access network notification area updates and radio access network notification area-crossing based periodic radio access network notification area update.

20. The apparatus according to claim 15, wherein presence of the assistance information provided to the target network node indicates periodic radio access network notification area update.

* * * * *